A. C. RUSSELL
SUBMARINE.
APPLICATION FILED JUNE 9, 1917.
1,247,155.
Patented Nov. 20, 1917.
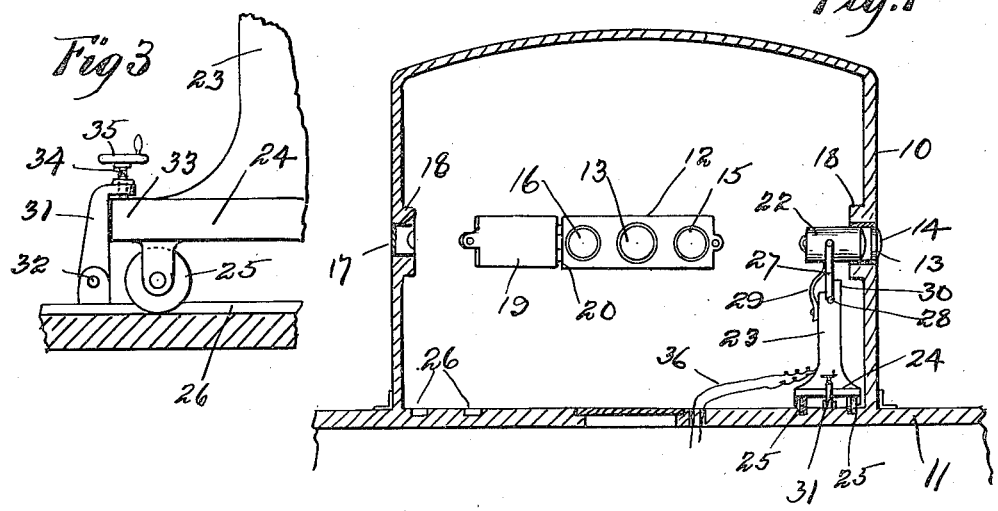
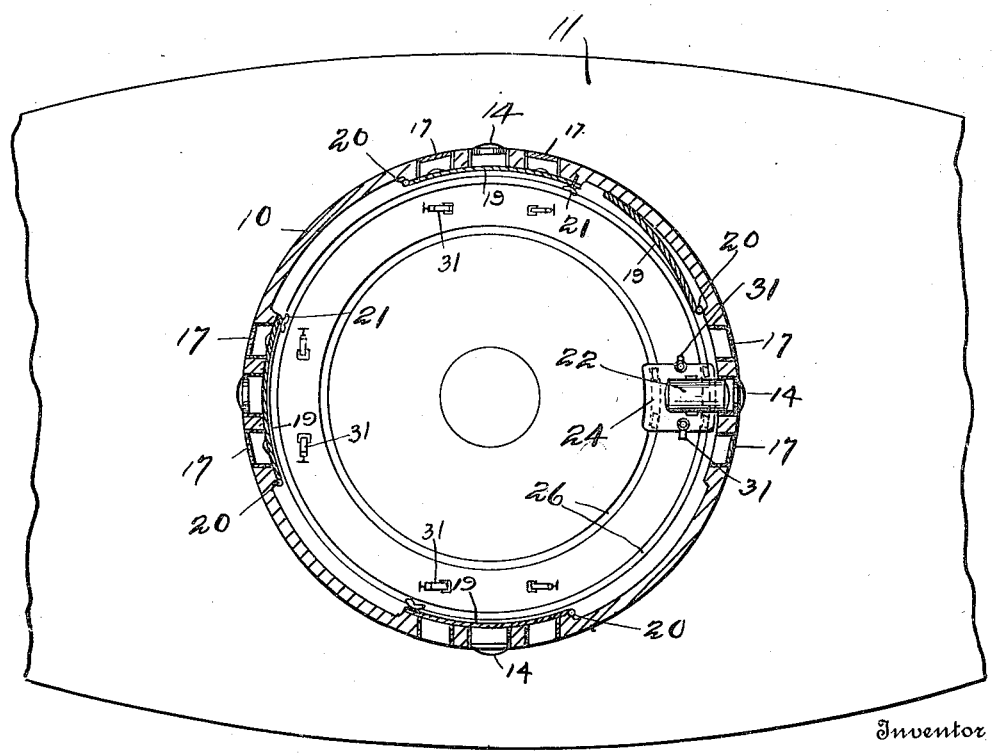
Witnesses
A. J. Macready.
J. L. Macdermott
Inventor
Amy C. Russell
By
Howard E. Barlow
Attorney

UNITED STATES PATENT OFFICE.

AMY C. RUSSELL, OF PROVIDENCE, RHODE ISLAND.

SUBMARINE.

1,247,155.     Specification of Letters Patent.     Patented Nov. 20, 1917.

Application filed June 9, 1917. Serial No. 173,803.

*To all whom it may concern:*

Be it known that I, AMY C. RUSSELL, a subject of the King of England, and resident of Providence, in the county of Providence and State of Rhode Island, have invented certain new and useful Improvements in Submarines, of which the following is a specification.

This invention relates to apparatus for use on submarines, and has for its object to provide a simple and effective means whereby powerful rays of light may be projected through the submerged walls of a ship into the water for the purpose of observing objects below the surface.

A further object of this invention is the provision of a group of portholes, each being provided with a transparent covering, one hole of said group being provided with a powerful light-intensifying lens through which the rays of a search light may be projected, the other holes of the group providing means for observation.

A further object of the invention is to provide a plurality of groups of portholes, and a powerful search light mounted on a carriage whereby it may be readily moved about from one group of holes to another, so that observations may be taken from all sides of the ship.

The invention further consists in the provision of means for locking the search-light carriage when in operative position before a porthole, and also to provide means for closing each group of portholes when not in use.

With these and other objects in view, the invention consists of certain novel features of construction, as will be more fully described, and particularly pointed out in the appended claims.

In the accompanying drawings:

Figure 1— is a sectional side elevation showing a conning tower provided with a plurality of groups of portholes and a search-light positioned at one of said groups.

Fig. 2— is a plan view sectioned on a line through the portholes of the conning tower.

Fig. 3— is an enlarged detail of the screw clamp for binding the search-light carriage when in operative position.

Referring to the drawings, 10 designates the conning tower as set upon the body portion 11 of a submarine. This conning tower is provided with a plurality of sets of portholes 12, one set looking forward, one aft, one to starboard and one to port. Each group is herein shown as containing three portholes, the middle hole 13 being provided with a powerful light-intensifying lens 14 and on either side of this central port are observation ports 15 and 16, each being preferably provided with a plate glass closure 17 through which a telescope may be operated; that is a search light is positioned at the middle port and observers may be stationed at either side thereof on the lookout for submerged objects which are brought into view by the use of the powerful search light.

The outer edges of these observation ports 15 and 16 are shaped to conform to the human face so that the observer upon placing his face close thereagainst shuts off all of the light from the room, thereby rendering his vision much more perfect.

The outer walls about each group are thickened as at 18 forming deep recesses for the ports, to permit the extending of the search light thereinto and to permit of the shaping of the other ports to fit the face of the observer.

A door or closure 19 is hinged as at 20 to this raised portion, whereby it may be swung over the group and close the same by means of a locking screw 21, rendering the same watertight even though the lenses should become broken by contact with floating objects.

The search light 22 is mounted upon a standard 23 on the carriage 24, which carriage is mounted upon four wheels 25, which run in grooves or tracks 26, for the purpose of guiding the carriage about the conning tower in moving the search light from one set of portholes to another.

The search light casing 22 is mounted on a yoke 27 pivoted at 28 and held in position by a spring 29 against the stop 30 whereby when it is desired to withdraw the search-light casing from its porthole it is only necessary to tip it back on the pivot 28, then move the carriage to the next porthole after which the casing is carried forward and fitted therein.

In order to securely lock this carriage against moving about by the rolling of the ship, I have provided a pair of clamps 31 which, as illustrated in Fig. 3, are hinged at 32 to the floor of the conning tower whereby they may be swung up over the edge 33 of the carriage and a screw 34 turned by the wheel 35, binds the carriage in position against any possibility of accidental movement.

The search light may be supplied with current from the wires 36, which may extend down to the source of supply.

The foregoing is directed more particularly toward the application of my invention to a submarine vessel, but the same may be adapted to be operated in the hull of any vessel below the water line through portholes formed therein for the purpose of projecting powerful light rays into the water, and to provide observation windows through which the lookout may readily observe any outside objects falling within the beam of light, and I desire it to be understood that I am not restricted to the details of construction shown but I reserve the privilege of resorting to all the mechanical changes to which the device is susceptible, the invention being defined and limited only by the terms of the appended claims.

I claim:

1. In combination with a vessel having one or more groups of portholes in its outer walls beneath the submerged water line, each hole being provided with a lens; of a search light within the vessel adapted to be positioned at one hole of each group, the other holes of each group providing means for observation.

2. A submarine having its outer walls provided with a group of lens-covered portholes, a search light adapted to be positioned at one hole of said group, the remaining holes of the group providing means for observation.

3. A submarine having its outer walls provided with a plurality of groups of lens-covered portholes, a search light adapted to be positioned at one hole of each group providing means for observation, and means for readily moving said search light from one group of holes to another.

4. A submarine having its walls provided with a plurality of groups of lens-covered portholes; a search light adapted to fit into one of said portholes on each group, the remaining holes of each group providing means for observation; a portable carriage on which said search light is mounted; and means whereby the carriage may be locked when the search light is positioned at the different groups of portholes.

5. A submarine having a conning tower, the walls of which are provided with a plurality of groups of glass covered portholes, one of said portholes being provided with a light intensifying lens; a search light mounted on a carriage; a track on which the carriage may be moved from one group of holes to another; and means for locking the carriage when the search light is positioned at a porthole.

In testimony whereof I affix my signature in presence of a witness.

AMY C. RUSSELL.

Witness:
 HOWARD E. BARLOW.